United States Patent [19]

Graves

[11] Patent Number: 5,382,190
[45] Date of Patent: Jan. 17, 1995

[54] PACKAGE OF SHIRRED FOOD CASINGS

[75] Inventor: Robert P. Graves, Downers Grove, Ill.

[73] Assignee: Viskase Corporation, Chicago, Ill.

[21] Appl. No.: 209,128

[22] Filed: Mar. 11, 1994

Related U.S. Application Data

[63] Continuation-in-part of Ser. No. 30,923, Mar. 12, 1993.

[51] Int. Cl.⁶ .................. B65D 85/20; A22C 13/00
[52] U.S. Cl. ............................ 452/21; 53/444; 53/463; 706/443; 706/802
[58] Field of Search .............. 452/21, 35; 53/427, 53/432, 433, 434, 479, 441, 444, 447, 461, 463, 466, 467; 208/802, 443, 427, 499

[56] References Cited

U.S. PATENT DOCUMENTS

| | | | |
|---|---|---|---|
| 2,967,383 | 1/1961 | Rumsey, Jr. | 53/434 |
| 3,283,893 | 11/1966 | Durocher et al. | 206/65 |
| 3,321,072 | 5/1967 | Alsys | 206/46 |
| 3,764,351 | 10/1973 | Whittington et al. | 206/46 |
| 3,971,187 | 7/1976 | McNeill | 53/427 |
| 4,211,054 | 7/1980 | Sramek | 53/236 |
| 5,046,295 | 10/1991 | Knecht | 53/234 |
| 5,092,107 | 3/1992 | Camm | 53/444 |
| 5,137,153 | 8/1992 | Hendriks | 206/443 |
| 5,228,572 | 7/1993 | Hendriks | 206/443 |

FOREIGN PATENT DOCUMENTS 1056319 6/1979 Canada.
296671 12/1990 Japan .................. 53/444

*Primary Examiner*—Willis Little
*Attorney, Agent, or Firm*—Roger Aceto

[57] ABSTRACT

A package or "caddie" of fifty (50) shirred tubular sticks of food casing is formed by stacking the sticks in seven rows one on another the lowermost row containing five side-by-side stack, each of the next four rows containing one stick more than the row below and each of the top two rows having one stick less than the row below. This forms a six sided caddie wherein all internal angles as formed by the sides of the stack are 120° and the perimeter of the stack is formed by a continuous unbroken progression of side-by-side sticks. A stretch film disposed transversely about the stack bundles the sticks tightly together.

11 Claims, 3 Drawing Sheets

PROIR ART CADDIES

PACKAGE OF SHIRRED FOOD CASINGS

This is a continuation-in-part of Ser. No. 08/030,923, filed Mar. 12, 1993.

TECHNICAL FIELD

The present invention relates to a package of shirred food casing comprising a bundle of shirred strands of food casings tightly wrapped in a plastic film which is disposed in tension about the bundle.

BACKGROUND OF THE INVENTION

Small diameter sausages such as frankfurters or the like usually are made using food casings of cellulose. Cellulose food casings or the like customarily are manufactured in long continuous tubular lengths. For handling convenience, these long tubular lengths are gathered into pleats by shirring and are longitudinally compressed by known techniques to obtain a shorter, relatively rigid tubular element known in the industry as a shirred casing stick. The coherency of a shirred stick is derived in part from the shirring operation which forms the casing into generally conical pleats which nest one within another.

During a stuffing operation the stick is loaded onto a stuffing horn and a food emulsion is fed through the horn and into casing which is drawn forward from the stick by the stuffing pressure. It is not uncommon for a shirred stick 50 cm long to contain upwards of 50 meters or more of casing so a large number of individual frankfurters are made with each stick.

Packaging and shipping of shirred sticks present several problems particularly for the type of casing used for frankfurters which generally have a wall thickness of only about 0.025 to about 0.05 mm.

For example, shirred sticks of this casing are relatively fragile in that the nested pleats of casing formed by the shirring operation are easily separated or pulled apart. If the pleats separate, the stick is said to break or lose "coherency". The result is one or more rigid shirred sections connected by loose unshirred sections. Sticks in this condition are not easily loaded onto a stuffing horn and are not at all suitable for automatic stuffing operations wherein the stick is loaded onto a stuffing horn by mechanical means. Accordingly, the packaging for the shirred sticks must be able to minimize stick breakage.

Shirred sticks also are susceptible to damage if made wet. Since stuffing machines frequently are hosed down with water after a stuffing operation, any sticks in the area must be retained in packaging which provides a barrier to water spray and is not itself damaged by water contact.

In commercial practice it generally is customary to package sticks in tight bundles of fifty (50) sticks. Bundling sticks together accomplishes several functions. For example, if the sticks are tight together, there is less likelihood of relative motion between the sticks so the sticks do not rub one against another. Rubbing together of sticks tends to produce undesirable pinhole damage in shirred casing. Also, a tight bundle helps to prevent bowing of individual sticks. Bowing is the result of a number of factors known in the art and is cause for concern because a bowed stick may not load onto a stuffing horn. A tight bundle further tends to reduce the likelihood of stick breakage as long as the bundle remains intact.

Conventional packaging for retaining a stick bundle generally is a carton or box made of corrugated fiberboard (cardboard) or a combination of corrugated fiberboard panels and a stretch or shrink wrap.

Corrugated fiberboard, hereafter "cardboard", has the drawbacks of adding bulk and expense to the packaging materials and unless it is treated, the material is subject to water damage.

Cardboard packaging also presents problems after use. For example, provision must be made for the collection, storage, disposal and possible recycling of such packaging. Also, there currently is a greater awareness of the environmental impact of packaging materials and the consumer demand, in general, is to reduce as much as possible the amount of packaging materials, such as cardboard, which is used.

Shirred sticks are sold in a number of different diameters and lengths. Accordingly, the count, or number of sticks per container may vary depending upon diameter and length. However, the most common count is fifty sticks per container, known in the art as a "caddie". It further is common to package at least four of such caddies together in a cardboard carton for shipment to the customer. In some cases, depending upon the size of the sticks, caddies may be packaged six or eight to a carton.

Thus, it is desirable not only to reduce or eliminate both the quantity of cardboard used for a caddie and the quantity of cardboard used to package the four, six or eight caddies together for shipment to a customer.

Various alternative packaging arrangements have been proposed which eliminates the corrugated fiberboard components of caddies. Such alternatives simply bundle the shirred sticks (usually fifty) together in various configurations using a flexible wrapper, stretch film, shrink film or the like. Typical packages of this sort are disclosed for example in U.S. Pat. Nos. 5,137,153 and 5,228,572. Pending U.S. application Ser. Nos. 08/030,923 filed Mar. 12, 1993 and Ser. No. 08/112,527 filed Aug. 27, 1993 both assigned to the assignee of this application, disclose still further packages formed with a shrink or stretch film.

The use of a stretch or shrink film to bundle shirred sticks of food casings reduces the volume of packaging materials and yet provides an inexpensive package which maintains the integrity of a caddie of food casings. Moreover, if the packaging film is in the form of a bag or the like, sticks of shirred casing which are removed but unused, can be returned to the package for further storage.

The usual complement of fifty sticks most commonly is arranged in a stack which generally is rectangular in cross section. In this respect, the sticks comprising the caddie are arranged in a cardboard container in ten rows of five sticks each piled one on another such as is shown for example in U.S. Pat. No. 3,471,305. Another rectangular cross sectional arrangement is formed by alternate rows of equal number of sticks wherein the rows are offset one from another so that a row above nests between the sticks of the row below. Such an arrangement is shown in U.S. Pat. No. 3,764,351. In still a further rectangular configuration, the stack of fifty sticks is formed using only nine rows wherein a row above nests between sticks of the row below but the number of sticks in each row alternate between six and five.

With any of the above arrangements, the stack is easily formed by piling sticks in a cardboard caddies. In the case of U.S. Pat. No. 3,764,351 which uses a shrink wrap film, the rectangular shape of the caddie is maintained by cardboard end panels.

It has been found that when only a shrink or stretch film is used for caddie packaging (no cardboard end panels) the rectangular stack is unstable. This is because the inward force exerted by the film in tension about each of the four edges of the stack tends to force the sticks toward a circular configuration. Once the sticks along the stack edges are displaced inward, tension is lost and the package becomes flaccid. This destroys the protection offered by bundling the sticks tightly together.

U.S. Pat. Nos. 5,228,572 and 5,137,153 disclose a film wrapped stack of shirred food casings which is more stable than a rectangular configuration. The sticks are stacked so that there are eight edges so the inward force exerted by the wrapper is distributed over a large area. This stack arrangement is obtained using an odd number of rows (n) wherein the middle row (n/2+1/2) contains one less stick than the rows immediately above and below. Thus, the stack in cross section is two sticks short of a regular hexagon so that when wrapped, the shape of the caddie is generally octagonal in cross section. Accordingly, while the stacking arrangement disclosed in U.S. Pat. Nos. 5,228,572 and 5,137,153 has a smaller perimeter and cross sectional area and is more stable than a conventional rectangular caddie, it nevertheless has several drawbacks.

For example, the omission of two sticks at either end of the middle row makes the stack difficult to form. Prior to wrapping, the middle and lower rows can be supported in a trough. However, in this stacking arrangement there is no inherent support, prior to wrapping, for the sticks at the ends of the rows above the middle row. Further, it can be shown that a larger carton is required to contain four such caddies than is required to contain four caddies of a conventional rectangular configuration. Thus, while wrapping the octagonal shape may use less wrapping film material, cardboard containers of larger surface area are required for a carton of four caddies. This is due to the fact that the caddie shape as disclosed in U.S. Pat. Nos. 5,228,572 and 5,137,153 do not nest one with another.

SUMMARY OF THE INVENTION

A caddie, according to the present invention has a cross sectional shape which is relatively stable. This means that when the stack is wrapped tightly, the sticks are less likely to shift their position than sticks which are stacked in a rectangular cross section. Also, the stack is densely packed in that side-by-side sticks form the entire perimeter with no vacant position due to a missing stick. This allows use of an easily adjustable trough to form the shape of the stack wherein the trough is adjusted depending upon the diameter of the sticks. Moreover, the stack is easily formed in that when sticks are laid into a trough for wrapping, all sticks of the uppermost rows are fully supported by the row below. Further, the resulting caddie, when wrapped, has a shape in cross section which allows adjacent caddies to nest one against another. The ability to nest provides advantages when four or more caddies are assembled in a carton. For example, this nesting relationship allows a reduction in the area of cardboard needed to form a four, six or eight caddie carton as compared to a non-nesting caddie configuration as shown in U.S. Pat. Nos. 5,225,572 and 5,137,153. Nesting also facilitates the assembling together of several caddies by stretch wrap packaging.

Accordingly, a caddie of shirred sticks of the present invention may be characterized by:

a) a plurality of tubular shirred sticks of food casing all of substantially equal diameter and length arranged in a stack with their longitudinal axes parallel and their ends coplanar;

b) said sticks being arranged in a plurality of rows piled one on another including a lowermost row containing at least two of said sticks and defining a base surface of said stack, each of the next four rows containing one stick more than the row below and a sixth row containing one less stick than the row below;

c) said rows being piled one on another such that said stack in transverse cross section has a shape comprising a perimeter of six sides and six internal angles of 120° each, said lowermost row defining a base side of said perimeter and no more than two of said sides being equal in length to said base side and said shape having mirror image symmetry about a line perpendicular to said base side and bisecting said shape, and d) a retainer comprising plastic film disposed in tension transversely about said stack for bundling said sticks tightly together and the width of said retainer being greater than the length of the sticks in said stack.

In a preferred embodiment involving a complement of fifty (50) sticks, the lowermost row contains five sticks. Each of the next four rows contain one more stick than the row below. Thus, the second through fifth rows contain six (6), seven (7), eight (8) and nine (9) sticks respectively. The next two rows each contain one less stick than the row below so the sixth and seventh rows contain eight (8) and seven (7) sticks respectively.

In cross section this stack is a six sided figure which geometrically is a truncated regular hexagon. In this respect each internal angle of the cross section is 120°. The base or bottom side of this shape, formed by the five side-by-side sticks of the lowermost row, is equal to the length of second and third sides which upstand from each end of the base. The top or sixth side of the shape is formed by seven side-by-side sticks and is the longest side. Fourth and fifth sides extending from each end of top are equal in length and are the shortest sides of the figure.

This configuration of sticks is dense in that the perimeter of the cross sectional shape is formed by a continuous array of side-by-side sticks. If a stick diameter is considered to be one unit, then the perimeter of this cross section is about 24.14 units and its area is about 44.69 square units.

In view of the irregular nature of the cross section, two caddies of this configuration can be nested together when placed side-by-side. For example, laying one caddie base, (bottom side) down (five stick row) next to a caddie laid top side down (seven stick row) allows the two widest parts of the cross section to overlap. The result is that the width of a container for these two nested caddies is shorter by one stick diameter in comparison to a carton needed when placing two regular hexagon shaped caddies side-by-side.

The amount of packaging material (such as cardboard) needed for a four caddie carton using the caddie configuration of the present invention can be demonstrated to be less than the amount of material needed for a similar carton using the caddie configuration of U.S. Pat. Nos. 5,137,153 and 5,228,572. Assuming a stick diameter of "D" and a stick length of "X", a four caddie carton using a fifty stick caddie of U.S. Pat. Nos. 5,137,153 and 5,228,572 is 14 D wide, 15.85 D high and "X" units long for a total surface area of 59.7 $DX + 443.8\ D^2$ square units. In contrast, a four carton caddie using the fifty stick caddie configuration of the present invention is 17 D wide, 12.39 D high and "X" long so its total surface area is 58.7 $DX + 421.26\ D^2$ square units. This provides a surface area savings of 0.92 $DX + 22.54\ D^2$ square units.

The savings in surface area of cardboard for a four caddie carton is even more dramatic when the carton is a regular slotted carton (RSC) commonly used for rectangular cardboard boxes. It is known in the cardboard packaging art that the area of an RSC carton is $(2L+2W)(H+W)$ where L, W and H are the length, width and height respectively of the carton (W being the shortest dimension). In this case, the area of cardboard needed for a carton of four, caddies of fifty sticks each, according to the present invention is 58.7 $DX + 728.28\ D^2$. The surface area of cardboard for a comparable four caddie carton using the fifty stick caddie configuration of U.S. Pat. No. 5,137,153 and 5,228,572 is 59.7 $DX + 835.\ D^2$. Thus, with a conventional RSC, the savings using a fifty stick caddie configuration of the present invention is some $DX + 105.52\ D^2$ square units of cardboard.

It should be appreciated that a conventional caddie which is rectangular in cross section, will pack four to a carton using less packaging material than either of the examples described above. However, as previously noted, a stack having a rectangular cross section and subjected to the radial inward force of a wrap stretched taught about the stack, is less stable than either of the multisided shapes used above to illustrate the surface area calculation.

Sticks of larger diameter and/or length usually are heavier and may be packaged twenty-five (25) to a caddie to facilitate handling. The present invention allows for a twenty-five stick caddie having the attributes as described herein of a fifty stick caddie. A twenty-five stick caddie according to the present invention will have six rows with the base or bottom row containing two (2) sticks. Each of the second through fifth rows will contain one stick more than the row below and the sixth or top row will contain one less stick than the row below. In this configuration, the transverse cross sectional shape of the stack will have six sides. All internal angles are 120° and the perimeter of the shape will have three shorter sides of equal length and three longer sides of equal length.

Thus, a characteristic of both the fifty and twenty-five stick caddies is that a transverse cross section is a shape having a six sided perimeter with all internal angles being 120° and further, the cross sectional shape has bilatal symmetry. In this respect, if the shape is bisected by a line perpendicular to the base side of the cross section, the shape on one side of this line will be the mirror image of the shape on the other side.

A caddie according to the present invention has the further attribute of being easily formed. For example, individual sticks are laid into a trough having a base and spaced side walls upstanding at an angle of 120° form the base. The space between the side walls is selected to accommodate just five sticks. Now as additional sticks enter or are laid into the trough they will stack between the trough side walls to the desired shape with one stick more in each row than in the row below. After the complement of fifty sticks has been loaded into the trough, relatively little manual adjustment may be needed to insure that the two uppermost rows contain the required number of sticks. The important aspect is that no sideways support is needed for these two uppermost rows since they are fully supported by the rows below.

This is not so with a stack which is rectangular in cross section. Nor is this so with the stacks as illustrated in U.S. Pat. Nos. 5,137,153 and 5,222,572. In each of such prior art arrangements, some sideways support is needed for the uppermost rows to hold them in place while being wrapped.

DETAILED DESCRIPTION OF THE INVENTION

Figure 1:
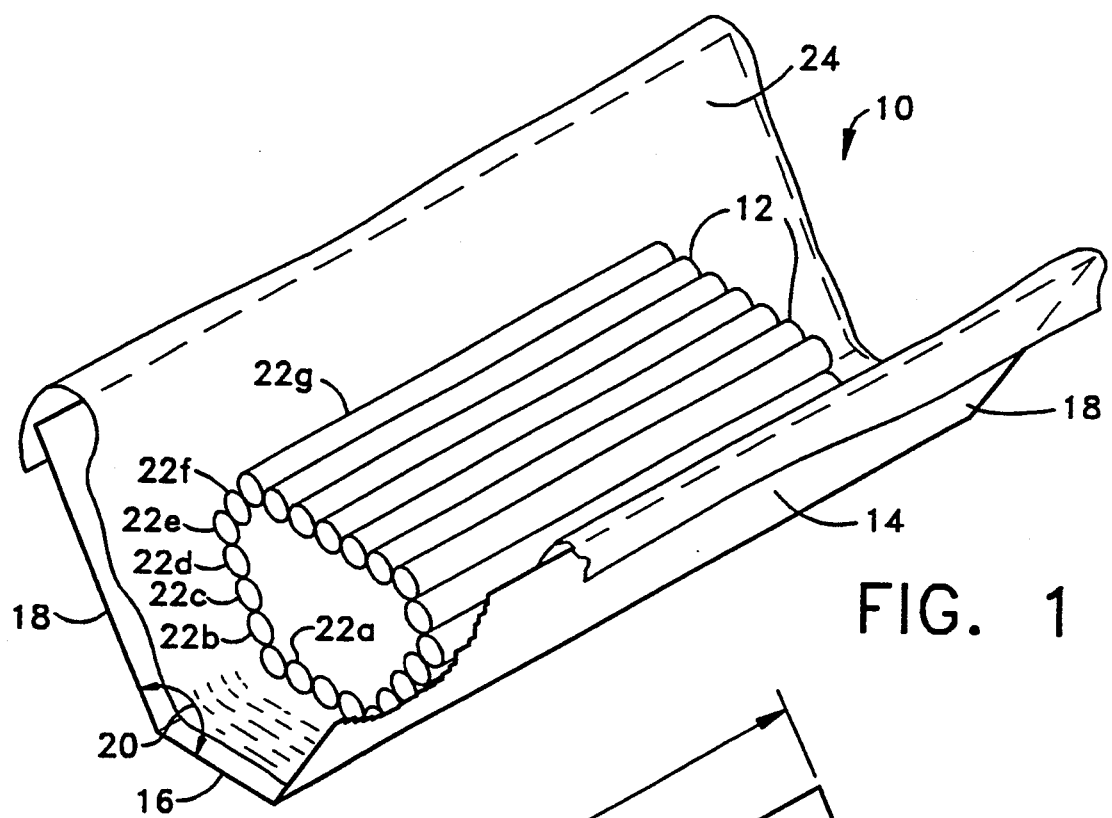
FIGS. 1 and 2 illustrate the formation of a caddie of shirred food casing sticks of the present invention.

Referring to the drawings, FIG. 1 shows a stack, generally indicated at 10, consisting of a plurality of sticks 12. As shown, the sticks in the stack have their longitudinal axes parallel and the ends of the sticks are generally coplanar. The sticks, as shown, are located in a trough 14. The trough has a base 16 and upstanding sidewalls 18. The included angle 20 between the base and each wall is about 120° so the walls flare outwardly. The sticks, as they are placed into the trough, will fill in between the walls and they will stack and nest one with another. The result is that each row of sticks will contain one more stick than the row below and the sticks in one row will be nested between sticks of the adjacent rows.

When a desired complement of fifty (50) sticks is in the trough, some manual manipulation may be needed to insure the top two rows have the desired number of sticks. The desired arrangement is to have the sticks form a hexagonal cross section. The complete stack, as shown in FIG. 1, has seven rows 22 $a$–$g$ of sticks stacked on one another. Starting from the bottom row 22$a$, each of the four rows 22 $b$–$e$ contains one more stick than the row below. These rows generally will form automatically because as the sticks are placed into the stack, they settle one on another and fill in between the trough walls 16, 18. Each of the next two rows 22 $f$, $g$, however, contains one less stick than the row below. Some manual manipulation of the sticks at the top of the stack might be needed to provide this arrangement. If the width of the base 16 is sufficient to accommodate five sticks side-by-side in the first row 22$a$, this means the stack of seven rows will contain fifty (50) sticks.

The trough is utilized to assist in forming the desired hexagon shape. Sticks, as they are produced are discharged into the trough and fill the space between the outwardly flared walls 18. Since the included angle 20 between each wall and the base is 120°, the sticks will fall into the desired pattern wherein each row contains one more stick than the row below. When fifty sticks are loaded, the upper two rows 22 f and g are manually arranged to provide the decreasing stick count in each row as described hereinabove. This provides a stack having the desired shape in transverse cross section. The preferred shape is an abbreviated version of a regular hexagon in that it has six sides, three of which are of equal length, and all included angles are 120°. However, the stack lacks the two additional rows required to form a regular hexagon in cross section wherein all sides are equal.

Figure 2:
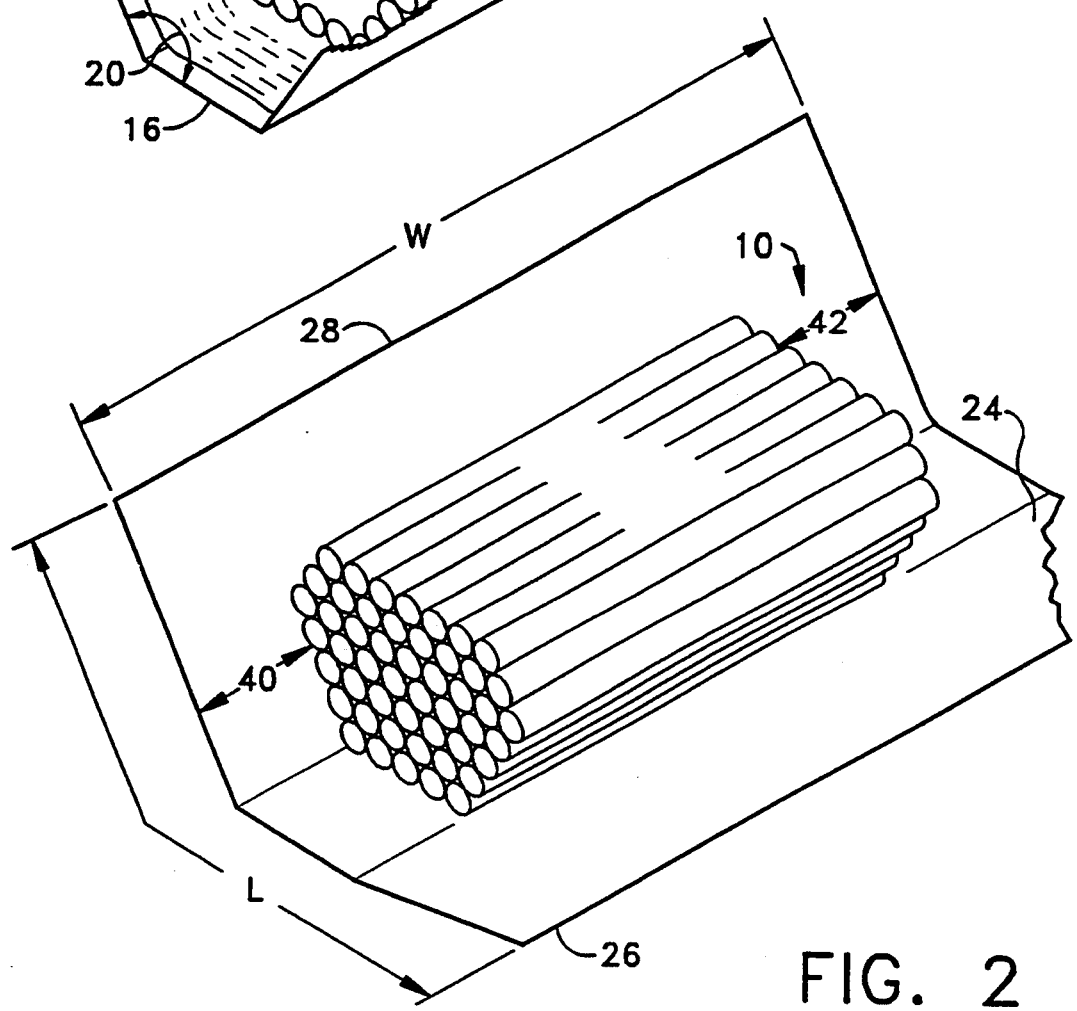

Once the stack is formed, the loose sticks are tightly bundled together. FIG. 2 shows the stack 10 located on a plastic film wrapper 24. The film can be any plastic film conventionally used in packaging applications and could be either a stretch or heat shrink film. For example suitable films include a 3 mil low density polyethylene film.

Preferably, the wrapper 24 has a length "L" which is longer than the perimeter of the stack and a width "W" which is greater than the stack length. This will facilitate enclosing the stack including closing over the ends of the stack as further described hereinbelow.

The wrapper is simply pulled tight around the stack and its opposite ends 26, 28 are pulled one over the other. An adhesive tape 30 (FIG. 3) then is laid along the overlap to hold the wrapper taught about the stack and to bundle the sticks tightly together. A material found suitable for the wrapper is a 3 mil (0.072 mm) polyethylene film sold by Armin Plastics Co. and identified as its film No. 7251C. This film is heat shrinkable and heat sealable. A suitable adhesive tape for use with this film is a two inch (50.8 mm) wide adhesive tape sold by Patco Corp. identified as its No. 503A Polyethylene tape. This tape has an acrylic based pressure sensitive adhesive on a low density polyethylene backing.

The stack can be formed and then moved to a wrapping station. However, in an alternative arrangement an appropriate wrapper 24 can be draped into the trough, as shown in FIG. 1, and the sticks then laid into the trough.

It has been found that sticks oriented in the hexagon as shown provides a relatively stable stack. In this respect, the sticks do not readily displace within the stack responsive to the radial pressure exerted by the wrapper. In contrast, a rectangular arrangement of sticks is more likely to collapse when tightly wrapped. This happens because the pressure exerted on the sticks at each of the four corners of the rectangle pushes these sticks radially inward which outwardly displaces sticks located towards the middle of each side.

When the wrapper 24 is in place about the stack, the lateral portions 40, 42 of the wrapper at each end of the stack (FIGS. 2) are closed. This can be done by spreading the film to a flat width and heat sealing in which heat seal bars (not shown) close against the wrapper. This gathers the lateral portions 40, 42 to a flat width for heat sealing.

Figure 3:
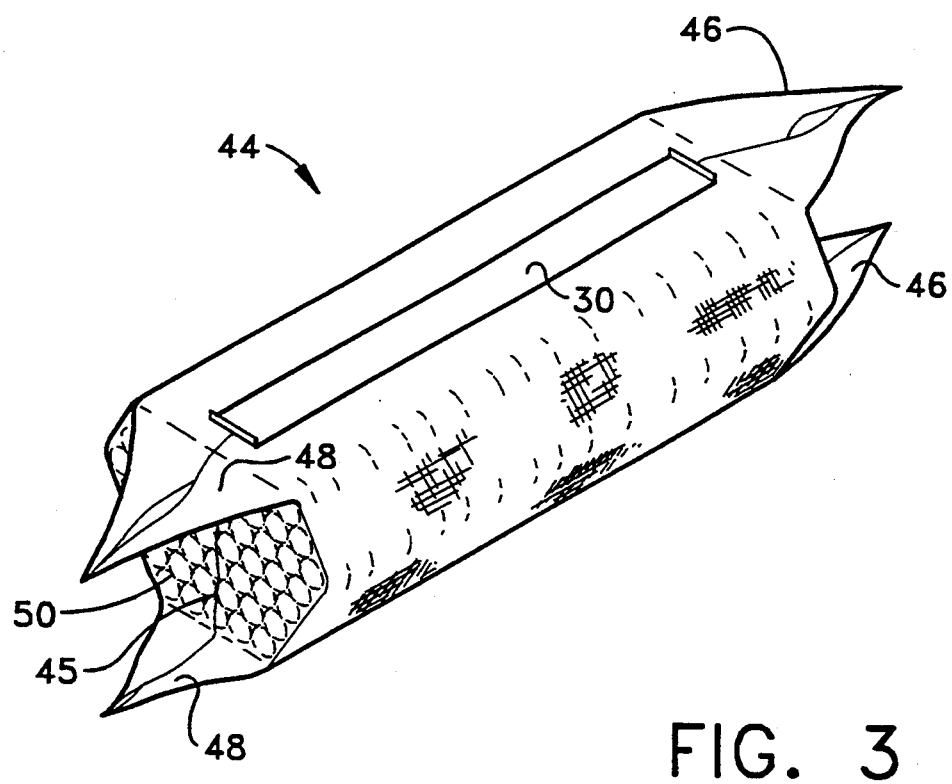
FIG. 3 is a perspective view of a fifty stick caddie according to the present invention.

The completed package or "caddie" 44 of fifty sticks is shown in FIG. 3. As a result of the flat width heat sealing of the wrapper as described herein, a heat seal 45 is formed at each end 50 of the caddie. Also, this forms pairs of tabs 46, 48 of the wrapper material at each end of the caddie which can be folded down flat against the ends 50 of the caddie.

It is convenient to stand a plurality of caddies 44 on end in a carton for shipment or they can be bound together with a stretch wrap. If a plurality of the caddies are tightly packed on end in a carton, the tab pairs 46 or 48 on the same end of the caddie provide a convenient means for grasping and lifting a caddie 44 from the carton. Tabs 46 and 48 being at opposite ends of the carton provide convenient means for manually grasping and lifting a horizontally oriented caddie and carrying it into a position for dumping out the sticks.

As an alternative arrangement, the wrapper can be in the form of a tubular film laid to its flat width wherein the flat width of the film is greater than a stick length. This flattened film is drawn up through an elongated slot (not shown) in the base 16 of the trough. The portion of flattened tubular film drawn up through the slot is opened so sticks can be loaded into the tube. The open end of the tubular film is folded over the top of the stack and taped shut or heat sealed. Thereafter, the film below the trough base is pulled to draw film down through the slot so the film tightens around the stack. While the film is held tight about the stack, it can be heat sealed across the film flat width by a heat sealer incorporated into the base of the trough. Since in this alternative the film is of tubular stock, it need not be closed by heat sealing over the ends of the caddie. Thus, if tubular film is used, the reference 45 denotes the crease identifying the side edge of the flattened tubular film. This alternative arrangement is described in more detail in a copending application Ser. No. 08/030,923 filed Mar. 12, 1993 the disclosure of which is incorporated herein by reference.

Figure 4:
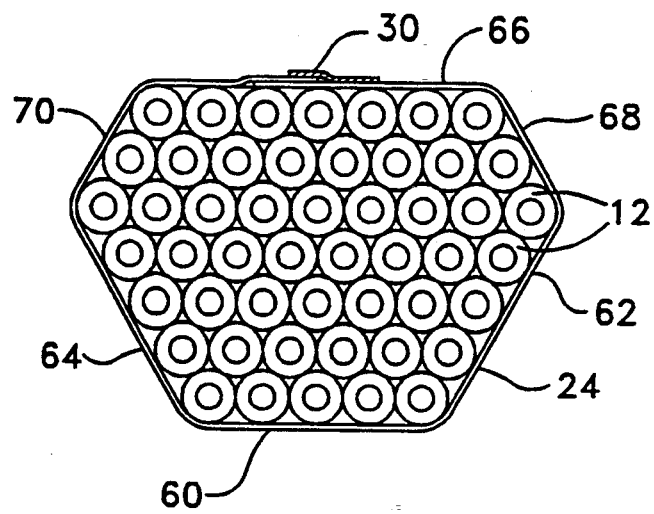
FIG. 4 shows a cross sectional view of a fifty (50) stick caddie according to the present invention.

A preferred fifty (50) stick caddie is shown in cross section in FIG. 4. It is clear that the packing of sticks in this configuration is relatively dense in that the entire perimeter of the cross sectional shape is made up of side-by-side sticks 12 held together by taught retainer 24 and adhesive tape 30 and there is no void in this perimeter made by an absent stick. Moreover, the cross sectional shape is a portion of a regular hexagon. In this respect, each internal angle is 120°. Further, the base 60 which is formed by the lowermost row of five side-by-side sticks is equal in length to the sides 62, 64 which upstand from the base. The top 66 of the stack, formed by the seven side-by-side sticks in the topmost row is the longest side. The remaining two sides 68, 70 which extend from either end of the top, are equal in length and are the shortest sides.

Figure 5:
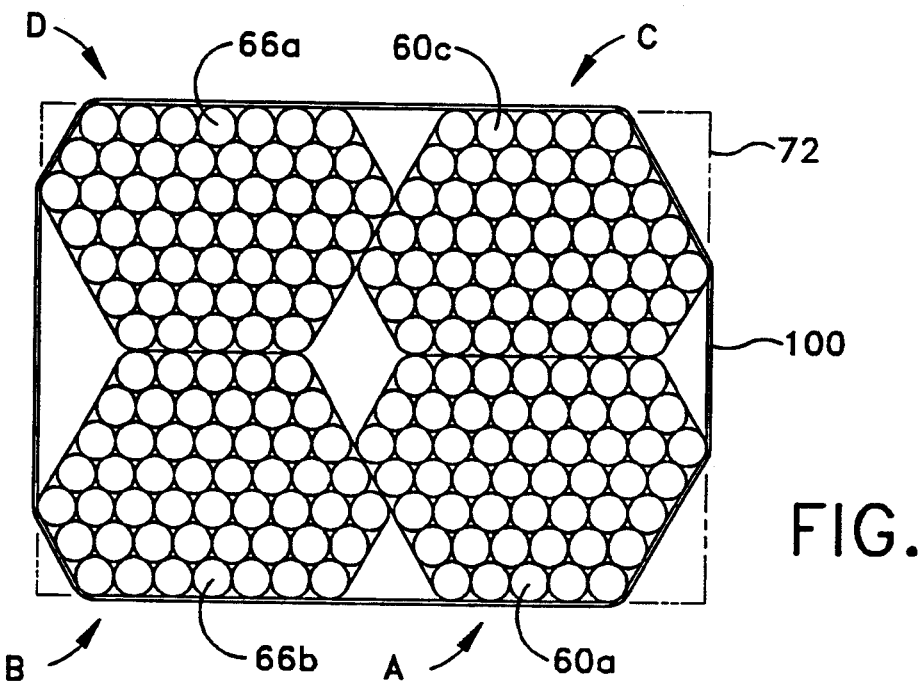
FIG. 5 shows, in cross section, an assembly of four caddies of the present invention as may be arranged in a carton.

Having equal internal angles with irregular side lengths, allows the caddie of the present invention to nest with others of the same shape. For example, FIG. 5 shows four such caddies arranged in a nested configuration inside a rectangular cardboard carton or the like 72 shown in dotted line. In this case one caddie "A" with its base side 60a (five stick row) down, is placed next to a caddie B having its top side 66b (seven stick row) down. This allows the two widest portions of the caddies as represented by the nine stick row to overlap. Two additional caddies C and D are placed on top of the first two in reverse order. In this respect caddie C, on top of caddie A, has its base side 60C up and caddie D, on top of caddie B has its top side 66d up. Thus, caddies C and D also nest. The result is to reduce the total surface area of the carton 72 needed to enclose the four caddies. For example, assuming each stick has a diameter D and a length "X", then the resulting carton would measure "X" long, 17 D wide and 12.39 D units high. This height takes into account that individual sticks in each row of the stack nest between the sticks of the adjacent row. Thus, the total surface area for a carton enclosing these four caddies as noted above is 58.78 DX+421.26 D² square units.

Figure 7:
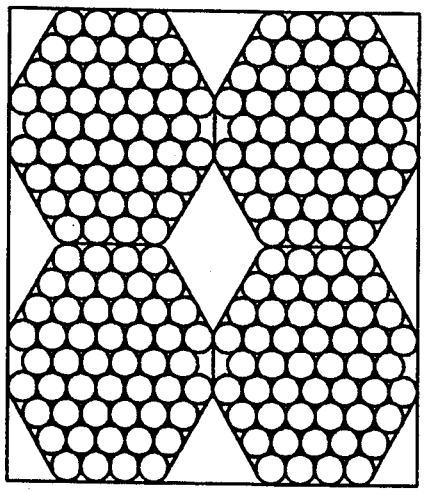
FIG. 7 is an end view showing a carton arrangement using a prior art caddie.

FIG. 7 is an end view of a carton containing four prior art caddies of the type disclosed in U.S. Pat. Nos. 5,137,153 and 5,228,572. Again, if each stick has a diameter D and the length is "X", then this carton measures "X" long, 15.88 D high and 14 D wide wherein the stack height takes into account the nesting of the sticks in one row with the sticks in the adjacent rows above and below. The total surface area then is 59.7 DX+443.8 D² square units which is some 0.92 DX+22.54 D² square units more than a comparable 200 stick carton using the caddie arrangement of the present invention.

Figure 6:
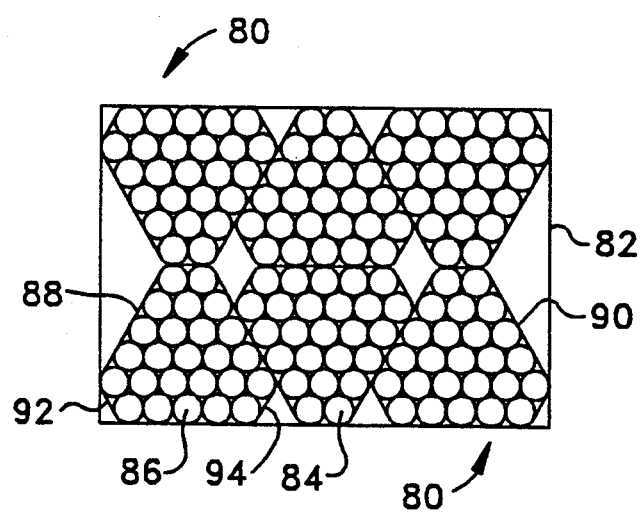
FIG. 6 is a cross sectional view showing a twenty-five (25) stick caddie embodiment of the present invention.

As noted above, for sticks of larger diameter, it may be desirable to have only a twenty-five stick caddie. FIG. 6 shows, in cross section, several twenty-five stick caddies 80 nested together and placed in a rectangular carton 82.

As shown in FIG. 6, the internal angles of each twenty-five stick caddie is 120°. However, a twenty-five stick caddie has only seven rows wherein the base row 84 contains only two side-by-side sticks. The second, third, fourth and fifth rows contain 3, 4, 5 and 6 sticks respectively and the top row 86 of each caddie contains five sticks. With this arrangement the base side 80 is the shortest. The two sides 88, 90 upstanding from each end of the base and the top side 86 are equal length. The two sides 92, 94 extending from each end of the top side are each equal in length to the base.

As described hereinabove a rectangular cardboard carton may be used to package a plurality of caddies together. However, the nestability of the caddie of the present invention lends itself to stretch wrapping of several caddies together. For example, such stretch wrapping 100 is shown in solid line in FIG. 5. Moreover, if stretch wrapping is used to bundle caddies together then multiples of the four caddies shown in FIG. 5 can be so wrapped for pallet loads.

Having thus described the invention in detail, it should be appreciated that the present invention provides an efficient packaging of shirred sticks of food casings. The preferred six sided configuration has sticks densely packed together and provides a relatively stable configuration when tightly wrapped with a film or the like to bundle the sticks together. This eliminates the need of using cardboard for individual caddies without compromising the protection for individual sticks offered by bundling them tightly together. Moreover, the cross sectional shape as disclosed herein lends itself to a nesting of caddies to reduce the amount of packaging material used for cartons.

Having described the invention in detail, what is claimed as new is:

1. A caddie of tubular shirred sticks of food casing comprising:
    a) a plurality of tubular shirred sticks of food casing all of substantially equal diameter and length arranged in a stack with their longitudinal axes parallel and their ends coplanar;
    b) said sticks being arranged in a plurality of rows piled one on another including a lowermost first row containing at least two of said sticks and defining a base surface of said stack, each of the next four rows containing one stick more than the row below and a sixth row containing one less stick than the row below;
    c) said rows being piled one on another such that said stack in transverse cross section has a shape comprising a perimeter of six sides and six internal angles of 120° each, said lowermost row defining a base side of said perimeter and no more than two of said sides being equal in length to said base side and said shape having mirror image symmetry about a line perpendicular to said base side and bisecting said shape, and
    d) a retainer comprising plastic film disposed in tension transversely about said stack for bundling said sticks tightly together and the width of said retainer being greater than the length of said sticks in said stack.

2. A caddie as in claim 1 wherein said stack contains twenty-five sticks, said lowermost row contains two sticks, said sixth row contains five sticks and defines a top surface of said stack, and said stack in transverse cross section having a perimeter of alternate short and long sides, all said short sides being of equal length and all said long sides being of equal length.

3. A caddie as in claim 1 wherein:
    a) said stack contains fifty sticks, said lowermost row containing five sticks and said stack having a seventh row which contains one less stick than said sixth row, said seventh row defining a top surface of said caddie;
    b) said stack in transverse cross section having a perimeter of six sides including:
        i) a topside as defined by said seventh row of sticks being the longest of said six sides;
        ii) a base side as defined by said lowermost row of sticks being equal in length to each of two adjacent sides of said perimeter and being shorter than said top side; and
        iii) two remaining sides being of equal length and shorter than said base side.

4. A plurality of caddies as in claim 2 or 3 arranged in a nested relationship and packaged together comprising at least four of said caddies arranged in two pairs, each pair including one caddie nested together with a second wherein said one caddie is inverted relative to said second such that a base surface of one and a top surface of another are coplanar and said pairs being arranged such that both caddies of one pair are disposed against both caddies of the other pair; and means holding said plurality of caddies together.

5. A plurality of caddies as in claim 4 wherein said means comprise a stretch wrap film disposed transversely around said at least four caddies.

6. A caddie as in claim 1 wherein the width of said retainer is of a length sufficient to provide lateral portions which are closed over the ends of said stack.

7. A caddie as in claim 6 wherein said lateral portions are heat sealed together at each end of said stack to enclose the ends thereof.

8. A caddie as in claim 6 wherein said retainer is a tubular film wherein the flat width of the tubular film is greater than the length of said sticks.

9. A caddie of tubular shirred sticks of food casing comprising:
    a) fifty sticks of tubular shirred food casings all of substantially equal diameter and length arranged in a stack with their longitudinal axes parallel and their ends coplanar;

b) said stack having seven rows of sticks including a lowermost first row containing five sticks positioned side-by-side such that said first row is five stick diameters wide;

c) each of the next four rows containing one stick more than the row below and each of the next two rows containing one less stick than the row below such that the uppermost seventh row of said stack contains seven sticks positioned side-by-side, the sticks of each of said rows being nested between sticks of an adjacent row;

d) a retainer disposed in tension transversely about said stack to bundle said sticks tightly together; and e) said caddies in transverse cross section having a perimeter of six sides and six internal angles of 120° each, three adjacent sides of said perimeter including a base side being of equal length, a top side of said perimeter being longer than said base side and the remaining two sides being of equal length and shorter than said base side.

10. A caddie as in claim 9 wherein said retainer is a stretch film having opposite ends drawn taught about said stack and overlapped over said seventh row of sticks, and an adhesive tape extending along said overlapped ends and adhered thereto for holding said stretch film taught about said stack.

11. A caddie as in claim 9 nested together with a second caddie wherein said caddies are of identical conformation and are nested side-by-side and a stretch film disposed about both said caddies for bundling them together.

* * * * *